(12) United States Patent
Chen et al.

(10) Patent No.: US 12,712,236 B2
(45) Date of Patent: Aug. 18, 2026

(54) BATTERY CELL, BATTERY, AND ELECTRIC APPARATUS

(71) Applicant: CONTEMPORARY AMPEREX TECHNOLOGY (HONG KONG) LIMITED, Hong Kong (CN)

(72) Inventors: Shilong Chen, Ningde (CN); Piaopiao Yang, Ningde (CN); Xiaobo Chen, Ningde (CN); Yao Li, Ningde (CN); Lu Hu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 603 days.

(21) Appl. No.: 18/306,447

(22) Filed: Apr. 25, 2023

(65) Prior Publication Data

US 2023/0268608 A1 Aug. 24, 2023

Related U.S. Application Data

(63) Continuation of application No. PCT/CN2021/122383, filed on Sep. 30, 2021.

(51) Int. Cl.
*H01M 50/342* (2021.01)
*H01M 10/0585* (2010.01)
(Continued)

(52) U.S. Cl.
CPC ..... *H01M 50/342* (2021.01); *H01M 10/0585* (2013.01); *H01M 10/443* (2013.01);
(Continued)

(58) Field of Classification Search
CPC ............ H01M 50/342; H01M 50/186; H01M 50/147; H01M 10/0585; H01M 10/443;
(Continued)

(56) References Cited

U.S. PATENT DOCUMENTS

2019/0027717 A1* 1/2019 Chen .................. H01M 50/147
2019/0058225 A1 2/2019 Noreus
(Continued)

FOREIGN PATENT DOCUMENTS

CN 108666458 A 10/2018
CN 209104274 U 7/2019
(Continued)

OTHER PUBLICATIONS

CN 113300046 MT (Year: 2021).*
(Continued)

*Primary Examiner* — Alexander Usyatinsky
(74) *Attorney, Agent, or Firm* — Ladas & Parry LLP

(57) ABSTRACT

A battery cell, including a housing, a pressure relief member disposed on a first wall of the housing, an electrode assembly disposed inside the housing, an electrolyte immersing the electrode assembly, and a sealing member and an active substance that are disposed inside the housing. The sealing member is configured to seal the active substance on a side of electrode assembly close to the first wall. The sealing member is configured to be actuated when an internal pressure or temperature of the battery cell reaches a first threshold, to release the active substance, and the active substance is able to react with the electrolyte and/or the electrode assembly to increase the internal pressure or temperature of the battery cell, so as to actuate the pressure relief member. The battery cell can quickly discharge its internal temperature and pressure when experiencing thermal runaway, and the battery cell has good safety performance.

12 Claims, 8 Drawing Sheets

(51) Int. Cl.

| | |
|---|---|
| ***H01M 10/44*** | (2006.01) |
| ***H01M 50/147*** | (2021.01) |
| ***H01M 50/186*** | (2021.01) |
| *H01M 50/247* | (2021.01) |
| *H01M 50/249* | (2021.01) |

(52) U.S. Cl.
CPC ....... *H01M 10/445* (2013.01); *H01M 50/147* (2021.01); *H01M 50/186* (2021.01); *H01M 50/247* (2021.01); *H01M 50/249* (2021.01)

(58) Field of Classification Search
CPC . H01M 10/445; H01M 50/249; H01M 50/247
See application file for complete search history.

(56) References Cited

U.S. PATENT DOCUMENTS

| | | | | |
|---|---|---|---|---|
| 2021/0320337 | A1* | 10/2021 | Chen ....................... | H01M 6/50 |
| 2023/0056487 | A1* | 2/2023 | Asanin ................ | H01M 50/383 |

FOREIGN PATENT DOCUMENTS

| | | | | | |
|---|---|---|---|---|---|
| CN | 211828854 U | | 10/2020 | | |
| CN | 112086605 A | | 12/2020 | | |
| CN | 112467300 A | | 3/2021 | | |
| CN | 113300046 | * | 8/2021 | | |
| CN | 113300046 A | | 8/2021 | | |
| CN | 214254572 U | | 9/2021 | | |
| DE | 102020109634 B3 | * | 6/2021 | .......... | H01M 50/233 |
| JP | H06338323 A | | 12/1994 | | |
| JP | H10241738 A | | 9/1998 | | |
| JP | H1140204 A | | 2/1999 | | |
| JP | 2007227171 A | | 9/2007 | | |
| JP | 2010182460 A | | 8/2010 | | |
| JP | 2013012448 A | | 1/2013 | | |
| WO | 2012031981 A1 | | 3/2012 | | |
| WO | 2015182136 A1 | | 12/2015 | | |
| WO | WO-2020133745 A1 | * | 7/2020 | ............. | H01M 6/50 |

OTHER PUBLICATIONS

The decision of JPO to grant a Patent for Application JP 2023519922 (Year: 2025).*
Decision to Grant a Patent, JP application No. 2023-519922, dated Jul. 8, 2025.
International Search Report for PCT Application No. PCT/CN2021/122383, mailed Jun. 23, 2022.
Written Opinion of the International Search Authority for PCT Application No. PCT/CN2021/122383, mailed Jun. 23, 2022.
Extended European Search Report for EP application No. 21958962.9, dated Mar. 29, 2024.
Notice of Reasons for Refusal, JP application No. 2023-519922, dated Jun. 4, 2024.
Notice of Office Action, KR application No. 10-2023-7011085, dated Nov. 18, 2024, 7 pages.
Notification of Grant of Invention Patent, CN application No. 202180073498.2, dated Jun. 29, 2026.

* cited by examiner 1123
154
155
1121
13
1512
154
112
151
1122
Z
16
1513
15
X

BATTERY CELL, BATTERY, AND ELECTRIC APPARATUS

CROSS REFERENCE TO RELATED APPLICATION

This application is a continuation of International Patent Application No. PCT/CN2021/122383, filed on Sep. 30, 2021, which is incorporated in reference in its entirety.

TECHNICAL FIELD

This application relates to the field of battery manufacturing technology, and specifically to a battery cell, a battery, and an electric apparatus.

BACKGROUND

With rapid development of new energy vehicle industry, the technological level of the lithium battery industry has also been improving rapidly, imposing high requirements on safety performance of battery cells.

In a case that thermal runaway occurs in a battery cell, internal temperature and pressure increase abruptly. If the internal temperature and pressure cannot be discharged in a timely manner, battery cell deflagration may occur, resulting in serious safety accidents.

SUMMARY

In view of this, this application provides a battery cell, a battery, and an electric apparatus. The battery cell can quickly discharge internal temperature and pressure when experiencing thermal runaway, and has good safety performance.

Embodiments of a first aspect of this application provide a battery cell, including: a housing; a pressure relief member disposed on a first wall of the housing; an electrode assembly disposed inside the housing; an electrolyte immersing the electrode assembly; and a sealing member and an active substance disposed inside the housing, where the sealing member is configured to seal the active substance on a side of the electrode assembly close to the first wall; and the sealing member is configured to be actuated when an internal pressure or temperature of the battery cell reaches a first threshold, to release the active substance, so that the active substance is able to react with the electrolyte and/or the electrode assembly to increase the internal pressure or temperature of the battery cell, so as to actuate the pressure relief member.

In the battery cell of the embodiments of this application, the active substance is sealed in the vicinity of the pressure relief member. When thermal runaway occurs at a location inside the battery cell, the sealing member is actuated before an internal temperature or pressure of the battery reaches an actuation threshold of the pressure relief member, to release the active substance, which leads to thermal runaway on a side of the electrode assembly close to the pressure relief member and breakage and disintegration of the electrode assembly, accompanied by generation of a large amount of high-temperature and high-pressure gas, so that temperature or pressure near the pressure relief member increases rapidly to actuate the pressure relief member and discharge internal pressure or temperature of the battery cell. In particular, when the thermal runaway location of the battery cell is far away from the pressure relief member, release of the active substance into the battery cell can guarantee that the pressure relief member is actuated effectively when thermal runaway occurs inside the battery cell. In this way, internal pressure or temperature of the battery cell can be discharged smoothly, allowing the battery cell to have high safety performance.

According to some embodiments of this application, the pressure relief member is configured to be actuated when the internal pressure or temperature of the battery cell reaches a second threshold, to discharge the pressure, where the second threshold is greater than the first threshold.

In the foregoing solution, both the pressure relief member and the sealing member are actuated by cracking under pressure, and the actuation threshold of the pressure relief member is greater than an actuation threshold of the sealing member. In this way, the sealing member can be actuated reliably before the pressure relief member, and the internal pressure of the battery cell can be discharged through the pressure relief member, allowing the battery cell to have good safety performance.

According to some embodiments of this application, the active substance is an oxidizing agent.

In the foregoing solution, a quick and strong reaction between the oxidizing agent and the electrode assembly and/or the electrolyte can break and disintegrate the electrode assembly, and a large amount of high-temperature and high-pressure gas are generated accordingly, ensuring that the pressure relief member is actuated, and pressure or temperature at the thermal runaway location inside the battery cell can be discharged smoothly through the pressure relief member.

According to some embodiments of this application, the active substance includes at least one of potassium permanganate, potassium dichromate, sodium hypochlorite, hydrogen peroxide, lead dioxide, periodic acid, cobaltic fluoride, and sodium ferrate.

In the foregoing solution, the above types of active substances do not react with the housing and the sealing member and are common oxidizing agents that are easily available at a low cost.

According to some embodiments of this application, the sealing member seals at least part of the active substance at a location corresponding to the pressure relief member.

In the foregoing solution, the active substance not only triggers chemical reactions at a location near the pressure relief member to actuate the pressure relief member, but also triggers chemical reactions at another location inside the battery cell to break the electrode assembly at a corresponding location, so that an exhaust passage from the thermal runaway location to the pressure relief member of the battery cell is unblocked, guaranteeing that a gas generated at the thermal runaway location of the battery cell can be discharged smoothly through the pressure relief member.

According to some embodiments of this application, the housing is provided with a pressure relief hole that is covered by both the pressure relief member and the sealing member, the sealing member is disposed on a side of the pressure relief member close to the electrode assembly, and the sealing member, the pressure relief member, and hole walls of the pressure relief hole jointly define an enclosed space for accommodating the active substance.

In the foregoing solution, the active substance is sealed in the pressure relief hole, without occupying too much space inside the battery cell, hence original energy density of the battery cell is maintained. In addition, the sealing member is actuated to release the active substance, so that the active substance can trigger chemical reactions at a location close to the pressure relief hole to reliably actuate the pressure relief member. Therefore, the battery cell has good safety performance.

According to some embodiments of this application, both the pressure relief member and the sealing member are sheet-shaped.

In the foregoing solution, both the pressure relief member and the sealing member are sheet-shaped, occupying small space inside the pressure relief hole, so that there is more space in the pressure relief hole for storing the active substance.

According to some embodiments of this application, the sealing member is made of an insulating material and the sealing member is disposed between the first wall and the electrode assembly to insulate and isolate the electrode assembly from the first wall.

In the foregoing solution, the sealing member is not only configured to seal the active substance, but also configured to insulate and isolate the electrode assembly from the first wall to allow the sealing member to integrate functions of insulation and sealing the active substance, which reduces a quantity of components inside the battery cell, providing the battery cell with a compact structure and high energy density.

According to some embodiments of this application, the sealing member is provided with a first accommodating chamber corresponding to a location of the pressure relief member, and at least part of the active substance is sealed in the first accommodating chamber.

In the foregoing solution, when actuated, the sealing member can release the active substance in the first accommodating chamber, trigger chemical reactions near the pressure relief member, and reliably actuates the pressure relief member, so that the battery cell has good safety performance.

According to some embodiments of this application, the first accommodating chamber is provided with a first opening, and the first opening is jointly enclosed by the first wall and the pressure relief member.

In the foregoing solution, the first wall, the pressure relief member, and the sealing member jointly form an enclosed first accommodating chamber, so that the active substance can be sealed near the pressure relief member, and sealing of the active substance can be easily implemented, where the active substance, when released, can trigger chemical reactions near the pressure relief member.

According to some embodiments of this application, the first wall is a rectangle, the sealing member is further provided with two second accommodating chambers, and in a length direction of the first wall, the two second accommodating chambers are separately located on two sides of the first accommodating chamber; and one part of the active substance is sealed in the first accommodating chamber while the other part of the active substance is sealed in the two second accommodating chambers.

In the foregoing solution, in a length direction of the first wall, one second accommodating chamber is provided respectively on two sides of the first accommodating chamber, a part of the active substance is sealed in the second accommodating chamber, and when the active substance in the second accommodating chamber is released, chemical reactions can be triggered at a corresponding location of the electrode assembly, to make a side of the electrode assembly close to the pressure relief member to be fully broken and keep the exhaust passage from the thermal runaway location to pressure relief member of the battery cell unblocked.

According to some embodiments of this application, the second accommodating chamber is provided with a second opening, and the second opening is enclosed by the first wall.

In the foregoing solution, the first wall and the sealing member jointly form an enclosed second accommodating chamber. The active substance when released can trigger chemical reactions at the corresponding location, and sealing of the active substance can be easily implemented.

According to some embodiments of this application, the housing includes a housing body and an end cover, where the housing body is provided with an opening, the housing body includes a side wall and a bottom wall, the bottom wall is disposed opposite the opening, the end cover is connected to the side wall and covers the opening, and the first wall is the end cover, the bottom wall, or the side wall.

In the foregoing solution, the first wall is the end cover, the bottom wall, or the side wall, and the first wall is provided with a pressure relief member. When thermal runaway occurs at a location inside the battery cell, the sealing member is actuated before an internal temperature or pressure of the battery reaches an actuation threshold of the pressure relief member, to release the active substance, which leads to breakage and disintegration of part of the electrode assembly close to the pressure relief member under chemical reactions, accompanied by generation of a large amount of high-temperature and high-pressure gas, so that temperature or pressure near the pressure relief member increases rapidly to actuate the pressure relief member and discharge internal pressure or temperature of the battery cell, Embodiments of a second aspect of this application provide a battery, including the battery cell according to the embodiments of the first aspect of this application.

Due to characteristics of the battery cell according to the embodiments of the first aspect of this application, the battery according to the embodiments of the second aspect of this application also has good safety performance.

Embodiments of a third aspect of this application provide an electric apparatus, including the battery according to the embodiments of the second aspect of this application.

Due to characteristics of the battery according to the embodiments of the second aspect of this application, the electric apparatus according to the embodiments of the third aspect of this application also has good safety performance.

Embodiments of a fourth aspect of this application provide a method for manufacturing battery cell, including:

providing a housing, where a first wall of the housing is provided with a pressure relief member;

providing an electrode assembly;

providing an electrolyte;

providing a sealing member and an active substance, where the sealing member is configured to seal the active substance, the sealing member is configured to be actuated when an internal pressure or temperature of the battery cell reaches a first threshold, to release the active substance, and the active substance is able to react with the electrolyte and/or the electrode assembly to increase the internal pressure or temperature of the battery cell, so as to actuate the pressure relief member; and disposing the electrode assembly inside the housing, sealing the active substance at a side of the electrode assembly close to the first wall by using the sealing member, and injecting the electrolyte into the housing.

Embodiments of a fifth aspect of this application provide a device for manufacturing battery cell, including:

- a first providing apparatus, configured to provide a housing, where a first wall of the housing is provided with a pressure relief member;
- a second providing apparatus, configured to provide an electrode assembly;
- a third providing apparatus, configured to provide an electrolyte;
- a fourth providing apparatus, configured to provide a sealing member and an active substance, where the sealing member is configured to seal the active substance, the sealing member is configured to be actuated when an internal pressure or temperature of the battery cell reaches a first threshold, to release the active substance, so that the active substance is able to react with the electrolyte and/or the electrode assembly to increase the internal pressure or temperature of the battery cell, so as to actuate the pressure relief member; and
- a mounting module, configured to dispose the electrode assembly in the housing, seal the active substance at a side of the electrode assembly close to the first wall by using the sealing member, and inject the electrolyte into the housing.

Additional aspects and advantages of this application will be given in part in the following description, part of which will become apparent from the following description or from the practice of this application.

BRIEF DESCRIPTION OF DRAWINGS

To describe the technical solutions in the embodiments of this application more clearly, the following briefly describes the accompanying drawings required for describing the embodiments. It is appreciated that the accompanying drawings below only show some embodiments of this application and thus should not be considered as limitations on the scope. A person of ordinary skill in the art may still derive other related drawings from the accompanying drawings without creative efforts.

Figure 1:
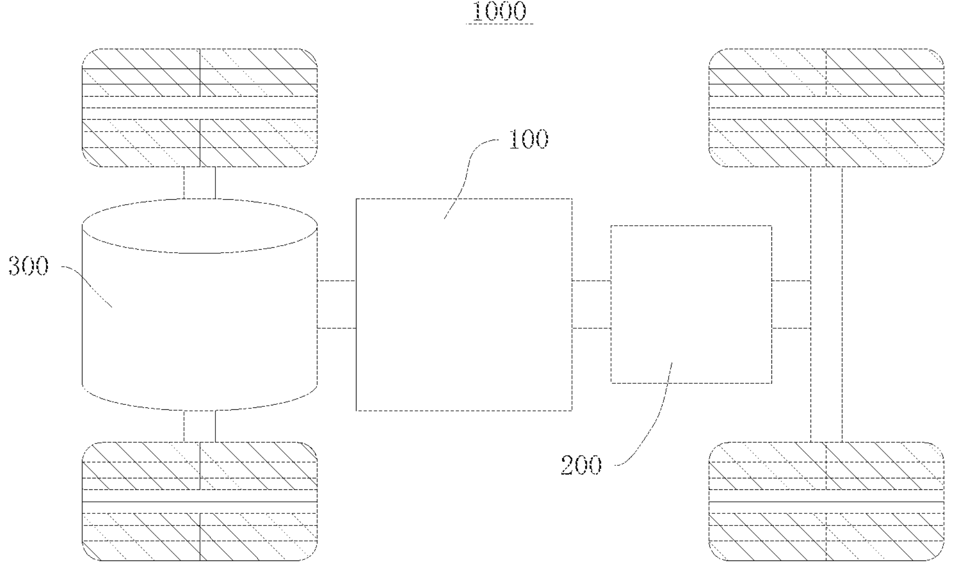
FIG. 1 is a simple schematic diagram of a vehicle according to an embodiment of this application.

The accompanying drawings are not drawn to scale.

REFERENCE SIGNS

1000: vehicle;
100: battery;
10: battery cell;
11: housing;
111: housing body;
1111: bottom wall;
1112: side wall;
112: end cover;
1121: pressure relief hole;
11211: hole wall;
1122: first side;
1123: second side;
1124: first part;
1125: second part;
1126: enclosed space;
113: opening;
12: electrode assembly;
121: main body;
122: tab;
13: pressure relief member;
14: electrode terminal;
15: sealing member;
151: first groove;
1512: first accommodating chamber;
1513: storage portion;
152: second groove;
1522: second accommodating chamber;
153: connecting portion;
154: support portion;
155: exhaust space;
16: active substance;
20: box;
21: first box;
22: second box;
200: controller; and
300: motor.

DETAILED DESCRIPTION

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. A person of ordinary skills in the art can understand specific meanings of these terms in this application as appropriate to specific situations.

In this application, "a plurality of" means more than two (inclusive).

In this application, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in the embodiments of this application. The battery cell may be in a cylindrical, flat, cuboid, or another shape, which is not limited in the embodiments of this application either. Battery cells are typically divided into three types by packaging method: cylindrical cell, prismatic cell, and pouch cell.

The battery mentioned in this embodiment of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied onto a surface of the positive electrode current collector. The part of positive electrode current collector uncoated with the positive electrode active substance layer protrudes beyond the part of positive electrode current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied onto a surface of the negative electrode current collector. The part of negative electrode current collector uncoated with the negative electrode active substance layer protrudes beyond the part of negative electrode current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. A material of the separator may be PP (polypropylene, polypropylene), PE (polyethylene, polyethylene), or the like. In addition, the electrode assembly may be a winding structure or a laminated structure, which is not limited in the embodiments of this application.

The battery cell further includes a pressure relief member that is actuated when an internal pressure of the battery cell reaches a threshold. Threshold design varies according to design requirements. Moreover, the threshold may depend on a material used for one or more of the positive electrode plate, negative electrode plate, electrolyte, and separator in the battery cell. The pressure relief member may be in a form of an explosion-proof valve, a gas valve, a pressure relief valve, a safety valve, or the like, and may specifically use a pressure sensitive or temperature sensitive element or structure. To be specific, when an internal pressure or temperature of the battery cell reaches the threshold, the pressure relief member performs an action or a weak structure provided in the pressure relief member is destroyed, thereby forming an opening or channel for discharge of the internal pressure or temperature.

"Actuate" mentioned in this application means that the pressure relief member is put into action or is activated to a given state such that the internal pressure and temperature of the battery cell are discharged. The action that the pressure relief member is put into may include but is not limited to, for example, cracking, breaking, tearing, or opening at least part of the pressure relief member. When the pressure relief member is actuated, high-pressure and high-temperature substances inside the battery cell are discharged from an opening as emissions. In this way, the battery cell can discharge its pressure and temperature under controllable pressure or temperature, thereby avoiding more serious potential accidents.

In related technologies, when thermal runaway occurs inside the battery cell, internal pressure or temperature of the battery cell begins to rise. When the internal pressure or temperature of the battery cell rises to a threshold that causes the pressure relief member to be actuated, at least part of the pressure relief member is cracked, broken, torn, or opened, thus high-pressure and high-temperature substances inside the battery cell are discharged from an opening, thereby avoiding more serious potential accidents.

The inventors have found through research that when the thermal runaway location of the battery cell is far away from the pressure relief member, for example, the thermal runaway location is on a side of the electrode assembly away from the pressure relief member, a counter-acting force generated by the thermal runaway pushes the electrode assembly to move towards the pressure relief member to block the pressure relief member. As a result, the pressure relief member cannot be actuated effectively, and a high-temperature and high-pressure gas inside the battery cell is unable to be discharged from the pressure relief member, leading to battery cell deflagration.

Based on the above ideas, this application proposes a new technical solution in which a pressure relief member can be actuated effectively even when the thermal runaway location is far away from the pressure relief member, so that internal pressure or temperature of the battery cell can be discharged rapidly, so that the battery cell has high safety performance.

It can be understood that the battery cell described in the embodiments of this application may directly supply power to an electric apparatus, or may be connected in series or in parallel to form a battery that supplies power to various electric apparatuses.

It can be understood that the electric apparatus that is described in the embodiments of this application and to which use of the battery cell or battery is applicable may be in a variety of forms, for example, mobile phones, portable devices, notebook computers, electric bicycles, electric vehicles, ships, spacecrafts, electric toys, electric tools, and the like. For example, the spacecraft includes an airplane, a rocket, a space shuttle, and a spaceship; the electric toy includes a fixed or mobile electric toy, for example, a game console, an electric vehicle toy, an electric ship toy, an electric airplane toy, and the like; and the electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, an electric planer, and the like.

The battery cell and the battery described in the embodiments of this application are applicable to not only the electric apparatuses described above, but also all electric apparatuses using the battery cells and the battery. However, for brevity of description, in the following embodiments, an electric vehicle is used as an example for description.

Figure 2:
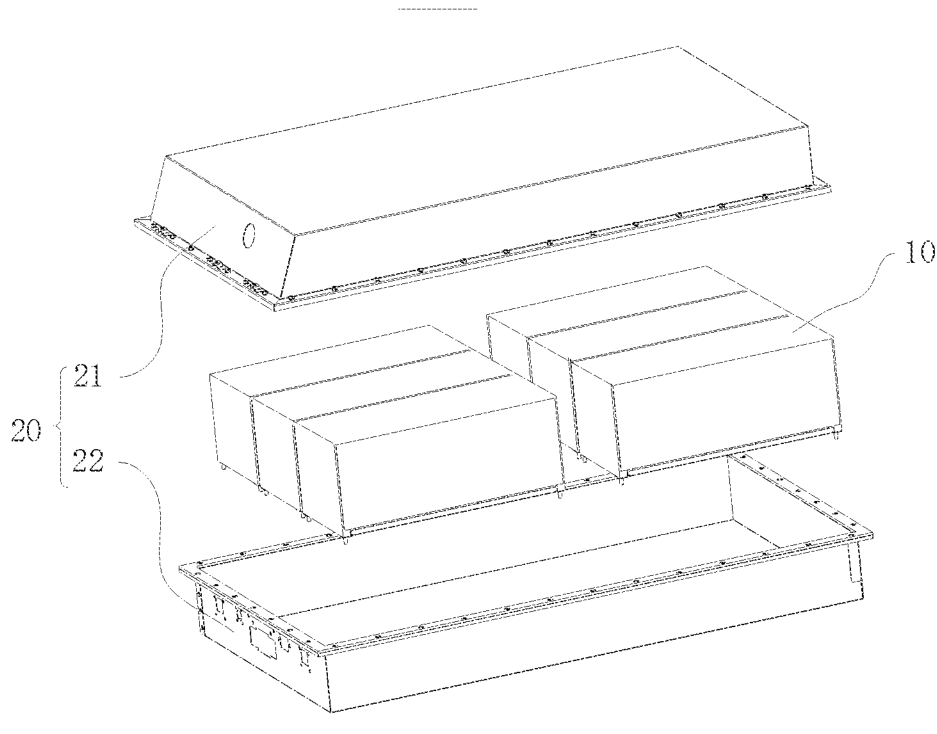
FIG. 2 is a schematic structural diagram of a battery of the vehicle in FIG. 1.

FIG. 1 is a simple schematic diagram of a vehicle according to an embodiment of this application; and FIG. 2 is a schematic structural diagram of a battery of the vehicle in FIG. 1.

As shown in FIG. 1, the vehicle 1000 is provided with a battery 100, a controller 200, and a motor 300 inside. For example, the battery 100 may be disposed at the bottom, front, or rear of the vehicle 1000. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like.

In some embodiments of this application, the battery 100 may be configured to supply power to the vehicle 1000. For example, the battery 100 may be used as an operational power source for the vehicle 1000. The controller 200 is configured to control the battery 100 to supply power to the motor 300, for example, to satisfy power needs of start, navigation, and driving of the vehicle 1000.

In other embodiments, the battery 100 can be used not only as the operational power source for the vehicle 1000, but also as a driving power source for the vehicle 1000, replacing or partially replacing fossil fuel or natural gas to provide driving traction for the vehicle 1000.

The battery 100 mentioned in this embodiment of this application is a single physical module that includes one or more battery cells 10 for providing a higher voltage and capacity. For example, the battery 100 is formed by connecting a plurality of battery cells 10 in series or in parallel.

As shown in FIG. 2, the battery 100 includes a plurality of battery cells 10 and a box 20. The plurality of battery cells 10 are placed in the box 20. The box 20 includes a first box 21 and a second box 22, where the first box 21 and the second box 22 are engaged with each other to form a chamber that accommodates the battery 100. The plurality of battery cells 10 are placed in the battery chamber. Shapes of the first box 21 and the second box 22 may be determined based on a shape of the combined plurality of battery cells 10, and the first box 21 and the second box 22 each may have an opening 113. For example, the first box 21 and the second box 22 each may be a hollow cuboid and have only one face as an opening face. The opening 113 of the first box 21 is disposed opposite the opening 113 of the second box 22, and the first box 21 and the second box 22 are fitted to each other to form a box 20 with an enclosed chamber. The plurality of battery cells 10 are connected in parallel, in series, or in parallel and in series, and then placed into the box 20 formed after the first box 21 and the second box 22 are fitted to each other.

Figure 3:
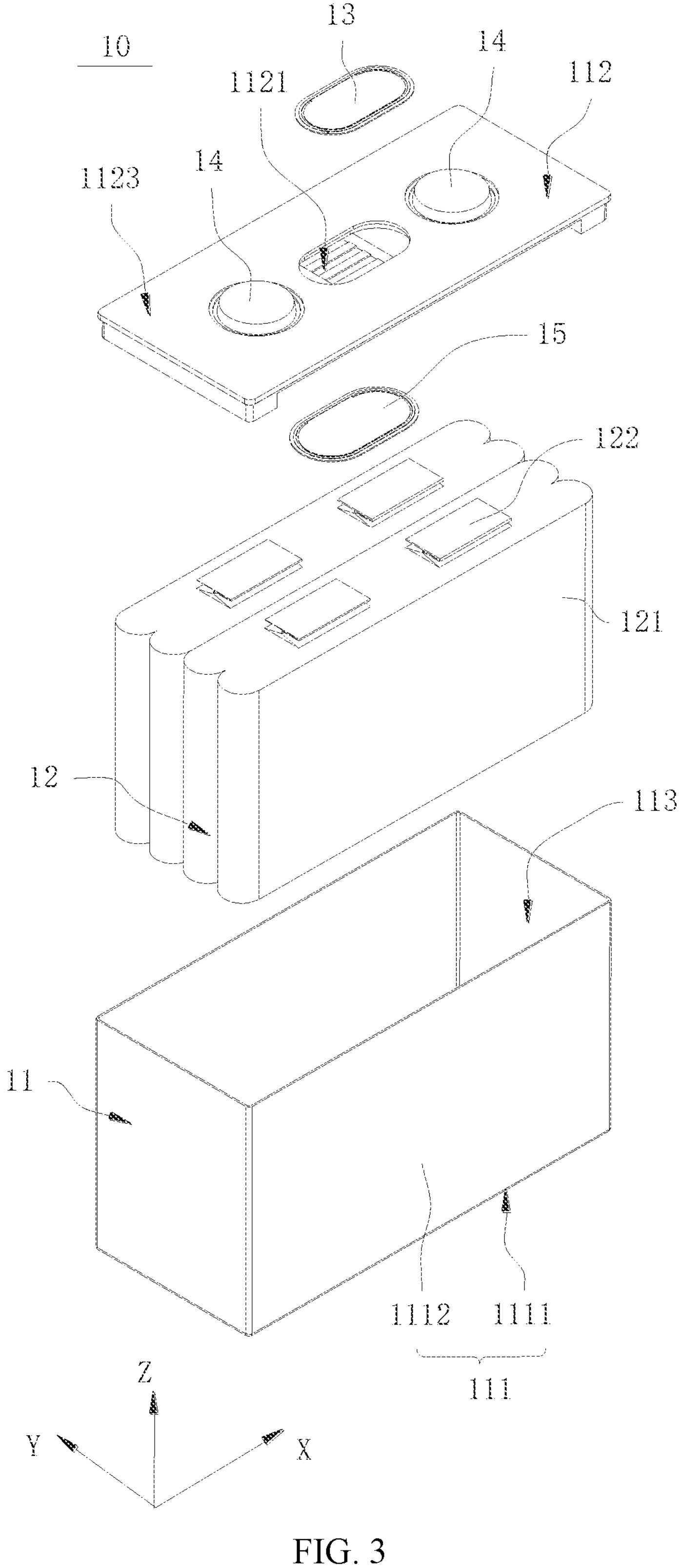
FIG. 3 is a schematic structural diagram of a first form of battery cell according to some embodiments of this application.

FIG. 3 is a schematic structural diagram of a first form of battery cell according to some embodiments of this application.

As shown in FIG. 3, the battery cell 10 includes a housing 11, an electrode assembly 12, a pressure relief member 13, two electrode terminals 14, two current collecting members (not shown in the figure), where the housing 11 includes a housing body 111 and an end cover 112, the housing body 111 includes a side wall 1112 and a bottom wall 1111 that is disposed opposite an opening 113, and the end cover 112 is connected to the side wall 1112 and covers the opening 113. The electrode assembly 12 and an electrolyte are disposed inside the housing 11, where the electrode assembly 12 is immersed into the electrolyte.

The housing body 111 may be in a hexahedron shape or may alternatively be in a cylindrical or an elliptic cylindrical shape. The housing body 111 may be made of a metal material, for example, aluminum, aluminum alloy, or nickel-plated steel. The end cover 112 matches the opening 113 of the housing body 111 in shape and size, and the end cover 112 is fastened to the opening 113 of the housing body 111, so as to seal the electrode assembly 12 and the electrolyte in an accommodating chamber of the housing body 111. The end cover 112 is made of a metal material, for example, aluminum, steel, or the like. The end cover 112 is provided with two electrode lead-out holes, and two electrode terminals 14 are disposed in the two electrode lead-out holes of the end cover 112. One of the two electrode terminals 14 is a positive electrode terminal and the other one is a negative electrode terminal.

In some embodiments of this application, a length direction of the housing body 111 extends in a first direction X, a height direction thereof extends in a second direction Z, and a thickness direction thereof extends in a third direction Y. The opening 113 and the bottom wall 1111 of the housing body 111 are arranged opposite each other in the second direction Z. The end cover 112 is rectangular in shape. A length direction of the end cover 112 extends in the first direction X, a width direction thereof extends in the third direction Y, and a thickness direction thereof extends in the second direction Z, where the first direction X, the second direction Z, and the third direction Y are perpendicular to each other.

In other embodiments, the housing body 111 may alternatively be a cylinder or an elliptic cylinder with an axis extending in the second direction Z. The end cover 112 matches the opening 113 of the housing body 111 in shape and size.

The electrode assembly 12 includes a main body 121 and two tabs 122 having opposite polarities. One of the two tabs 122 is a positive tab 122, and the other one is a negative tab 122. The main body 121 includes a positive electrode plate, a negative electrode plate, and a separator, where the separator is located between the positive electrode plate and the negative electrode plate to separate the positive electrode plate from the negative electrode plate. One of the two tabs 122 is a positive tab 122, and the other one is a negative tab 122. The positive electrode terminal 14 is electrically connected to the positive tab 122 through a current collecting member, and the negative electrode terminal 14 is electrically connected to the negative tab 122 through another current collecting member.

In some embodiments of this application, the battery cell 10 includes two electrode assemblies 12 that are stacked in the third direction Y. Each of the electrode assemblies 12 includes a main body 121 and two tabs 122 having different polarities. The tabs 122 of the same polarity of the two electrode assemblies 12 are connected to one corresponding electrode terminal 14 through a same current collecting member. In other embodiments, the battery cell 10 may alternatively include one electrode assembly 12 or another number of electrode assemblies 12 that are stacked.

In some embodiments of this application, both of the two tabs 122 having different polarities are located on a side of the main body 121 close to the end cover 112. In other embodiments, the two tabs 122 having different polarities may be located on two sides of the main body 121 in the first direction X, or located on a side of the main body 121 away from the end cover 112 in the second direction Z; and the two tabs 122 having different polarities may alternatively be located on two sides of the main body 121 in the second direction Z.

The pressure relief member 13 is disposed in the housing 11 and is configured to be actuated when the internal pressure or temperature of the battery cell 10 reaches a second threshold, to discharge the internal pressure and temperature of the battery cell 10. The second threshold may be a temperature threshold or a pressure threshold. The pressure relief member 13 may be disposed in the bottom wall 1111 or side wall 1112 of the housing body 111, or disposed in the end cover 112.

As shown in FIG. 3, in some embodiments of this application, the end cover 112 is provided with a pressure relief hole 1121 at a central location in the first direction X, and the pressure relief member 13 is disposed in the pressure relief hole 1121. The two electrode terminals 14 are disposed on two sides of the pressure relief hole 1121 in the first direction X. In other embodiments, depending on a shape of the battery cell 10, the end cover 112 may alternatively be in another shape, for example, being in a round or oval shape. The electrode terminal 14 and the pressure relief member 13 may alternatively be arranged in another form.

Figure 5:
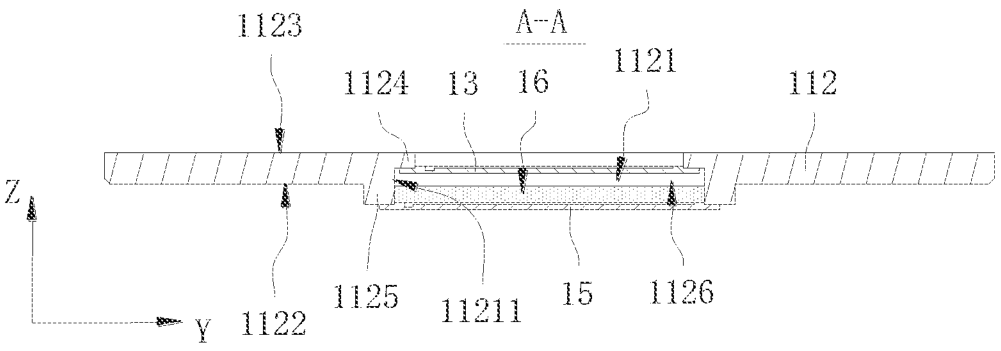
FIG. 5 is an A-A cross-sectional view of that shown in FIG. 4.

As shown in FIG. 3, in some embodiments of this application, the battery cell 10 includes a housing 11, a pressure relief member 13, an electrode assembly 12, an electrolyte (not shown in the figure), a sealing member 15, and an active substance 16 (referring to FIG. 5). The electrode assembly 12 is disposed inside the housing 11, where the electrode assembly 12 is immersed into the electrolyte, and the pressure relief member 13 is disposed on a first wall of the housing 11. The sealing member 15 and the active substance 16 are disposed inside the housing 11, and the sealing member 15 is configured to seal the active substance 16 on a side of the electrode assembly 12 close to the first wall. The sealing member 15 is configured to be actuated when an internal pressure or temperature of the battery cell 10 reaches a first threshold, to release the active substance 16, and the active substance 16 is able to react with the electrolyte and/or the electrode assembly 12, to increase the internal pressure or temperature of the battery cell 10, thereby actuating the pressure relief member 13.

The first wall may be in the side wall 1112 or bottom wall 1111 of the housing body 111, or in the end cover 112. In other words, the pressure relief member 13 may be disposed in the side wall 1112, the bottom wall 1111, or the end cover 112.

The first wall is provided with a pressure relief hole 1121 and the pressure relief member 13 is connected to the first wall and covers the pressure relief hole 1121. The pressure relief member 13 may be disposed at a central location in the first wall, or at a part of the first wall close to an edge. There are a variety of implementations in which the pressure relief member 13 is actuated. The pressure relief member 13 may be broken when the internal pressure of the battery cell 10 reaches a second threshold, to discharge the internal pressure or temperature of the battery cell 10, or may be melted when the internal temperature of the battery cell 10 reaches a second threshold, to discharge the internal pressure or temperature of the battery cell 10.

When the sealing member 15 is actuated, the active substance 16 may be completely released near the pressure relief member 13, or may be partially released near the pressure relief member 13, and partially released at another location.

There may be a variety of implementations in which the active substance 16 is sealed by the sealing member 15. The sealing member 15 may be enclosed with the first wall, the pressure relief member 13, and the like to form an enclosed space to seal the active substance 16. A hollow enclosed space may be provided inside the sealing member 15. The active substance 16 is sealed inside the sealing member 15 by using composite injection. The enclosed space may be fully filled with the active substance 16 or partially filled with the active substance 16.

The sealing member 15 may be a component that is independently disposed to implement a function of sealing the active substance 16, or may means that an original component inside the battery cell 10 is subject to structural improvement for purposes of insulation, sealing, and the like to have a function of sealing the active substance 16.

There are a variety of implementations in which the sealing member 15 is actuated, where the first threshold may be a pressure threshold or a temperature threshold. The sealing member 15 may be broken when the internal pressure of the battery cell 10 reaches a first threshold, to release the active substance 16, or may be melted when the internal temperature of the battery cell 10 reaches a first threshold, to release the active substance 16.

The active substance 16 may be liquid, solid, or powder. The active substance 16 may be a substance that reacts chemically with the electrolyte, a substance that reacts chemically with the electrode assembly 12, or a substance that reacts chemically with both the electrolyte and the electrode assembly 12. The active substance 16 may be an oxidizing agent, or another substance that can react chemically with the electrolyte and/or the electrode assembly 12, accompanied by generation of a large amount of high-temperature and high-pressure gas and breakage of the electrode assembly 12.

In the battery cell 10 of this embodiment of this application, the active substance 16 is sealed near the pressure relief member 13. When thermal runaway occurs at a location inside the battery cell 10, the sealing member 15 is actuated before an internal temperature or pressure of the battery 100 reaches an actuation threshold of the pressure relief member 13, to release the active substance 16, which leads to thermal runaway on a side of the electrode assembly 12 close to the pressure relief member 13 and breakage and disintegration of the electrode assembly, accompanied by generation of a large amount of high-temperature and high-pressure gas, so that temperature or pressure near the pressure relief member 13 increases rapidly to actuate the pressure relief member 13 and discharge the internal pressure or temperature of the battery cell 10. In particular, when the thermal runaway location of the battery cell 10 is far away from the pressure relief member 13, release of the active substance 16 into the battery cell 10 can guarantee that the pressure relief member 13 is actuated effectively when thermal runaway occurs inside the battery cell 10. In this way, internal pressure or temperature of the battery cell 10 can be discharged smoothly, allowing the battery cell 10 to have high safety performance.

As shown in FIG. 3, in some embodiments of this application, the housing 11 includes a housing body 111 and an end cover 112, where the housing body 111 is provided with an opening 113 and includes a side wall 1112 and a bottom wall 1111 that is disposed opposite the opening 113, and the end cover 112 is connected to the side wall 1112 and covers the opening 113. The first wall is the end cover 112, the bottom wall 1111, or the side wall 1112.

Specifically, the bottom wall 1111 and the opening 113 are arranged opposite each other in the second direction Z. A thickness direction of the end cover 112 extends in the second direction Z, and the end cover 112 is connected to an edge of the side wall 1112 away from the bottom wall 1111 and covers the opening 113, to seal the electrode assembly 12 inside the housing 11.

It can be understood that locations of the bottom wall 1111, the side wall 1112, and the end cover 112 are related to placement status of the battery cell 10.

In some embodiments of this application, the second direction Z extends in a vertical direction and the battery cell 10 is placed upright. The first wall is the end cover 112. The pressure relief hole 1121 is disposed upwards. The pressure relief member 13 is located on an upper side of the battery cell 10, and the bottom wall 1111 is located on a bottom side of the battery cell 10. When thermal runaway occurs inside the battery cell 10, the thermal runaway location may be located inside the electrode assembly 12, or close to a surface of the electrode assembly 12; and the thermal runaway location may be located at a part of the electrode assembly 12 close to the bottom wall 1111 or the side wall 1112, or at a part close to the end cover 112. In particular, when thermal runaway occurs at a location of the electrode assembly 12 close to the bottom wall 1111, an exhaust passage from a side of the electrode assembly 12 close to the bottom wall 1111 to the pressure relief member 13 is not unblocked. Actuation of the sealing member 15 prior to the actuation of the pressure relief member 13 prevents the electrode assembly 12 from being jacked up under local air pressure. The top of the electrode assembly 12 fits with the end cover 112 to block the pressure relief hole 1121, leading to ineffective actuation of the pressure relief member 13.

In other embodiments, the pressure relief hole 1121 can be made horizontally or downwards according to the placement status of the battery cell 10 and an arranged location of the first wall. The sealing member 15 is actuated in advance to release the active substance 16, guaranteeing that the pressure relief member 13 is actuated effectively.

In the foregoing solution, the first wall is the end cover 112, the bottom wall 1111, or the side wall 1112 and is provided with a pressure relief member 13. When thermal runaway occurs at a location inside the battery cell 10, the sealing member 15 is actuated before an internal temperature or pressure of the battery 100 reaches an actuation threshold of the pressure relief member 13, to release the active substance 16, which leads to breakage and disintegration of part of the electrode assembly 12 close to the pressure relief member 13 under chemical reactions, accompanied by generation of a large amount of high-temperature and high-pressure gas, so that temperature or pressure near the pressure relief member 13 increases rapidly to actuate the pressure relief member 13 and discharge the internal pressure or temperature of the battery cell 10.

In some embodiments of this application, the pressure relief member 13 is configured to be actuated when the internal pressure or temperature of the battery cell 10 reaches a second threshold, to discharge pressure, where the second threshold is greater than the first threshold.

There are a variety of implementations in which the pressure relief member 13 is actuated when an internal pressure of the battery cell 10 reaches the second threshold. The pressure relief member 13 may be a metal sheet with a nick on a surface, or may be a locally thinned polymer membrane. When the internal pressure of the battery cell 10 reaches the second threshold, the nick or a locally thinned zone is broken to discharge the internal pressure of the battery cell 10. An edge of the pressure relief member 13 may be bonded to the first wall, or pressed against the first wall with a sealing element or the like. When the internal pressure of the battery cell 10 reaches the second threshold, the edge of the pressure relief member 13 separates from the first wall to release the internal pressure of the battery cell 10.

In other embodiments, the pressure relief member 13 may also be actuated when the internal temperature of the battery cell 10 reaches the actuation threshold, where the temperature threshold for actuation of the pressure relief member 13 is higher than the internal pressure of the battery cell 10 when the sealing member 15 is actuated.

Both the pressure relief member 13 and the sealing member 15 are actuated by cracking under pressure, and the actuation threshold of the pressure relief member 13 is greater than an actuation threshold of the sealing member 15. In this way, the sealing member 15 can be actuated reliably before the pressure relief member 13, and the internal pressure of the battery cell 10 can be discharged through the pressure relief member 13, allowing the battery cell 10 to have good safety performance.

In some embodiments of this application, the active substance 16 is an oxidizing agent.

The oxidizing agent is able to react with the electrolyte and/or an electrode plate of the electrode assembly 12, which generates a large amount of high-temperature and high-pressure gas and breaks the electrode plate.

A quick and strong reaction between the oxidizing agent and the electrode assembly 12 and/or the electrolyte can break and disintegrate the electrode assembly 12, which is accompanied by generation of a large amount of high-temperature and high-pressure gas, ensuring that the pressure relief member 13 is actuated and that pressure or temperature of the thermal runaway location inside the battery cell 10 can be discharged smoothly through the pressure relief member 13.

In some embodiments of this application, the active substance 16 includes at least one of potassium permanganate, potassium dichromate, sodium hypochlorite, hydrogen peroxide, lead dioxide, periodic acid, cobaltic fluoride, and sodium ferrate.

The active substance 16 may be a single type of oxidizing agent or a mixture of a plurality of oxidizing agents. When the active substance 16 is separated and stored in different accommodating chambers, the active substance 16 in different accommodating chambers may be the same or different.

The foregoing type or types of active substances 16 do not react with the housing 11 and the sealing member 15 and are common oxidizing agents that are easily available at a low cost.

According to some embodiments of this application, the sealing member 15 seals at least part of the active substance 16 at a location corresponding to the pressure relief member 13.

All the active substance 16 may be sealed at the location corresponding to the pressure relief member 13, or a part of the active substance 16 may be sealed at the location corresponding to the pressure relief member 13, to trigger chemical reactions at a part of the electrode assembly 12 close to the pressure relief member 13, while another part of the active substance 16 is sealed at another location of the electrode assembly 12 close to the first wall, to trigger chemical reactions at another location of the electrode assembly 12 close to the first wall.

The active substance 16 not only triggers chemical reactions at a location near the pressure relief member 13 to actuate the pressure relief member 13, but also triggers chemical reactions at another location inside the battery cell 10 to break the electrode assembly 12 at a corresponding location, so that an exhaust passage from the thermal runaway location of the battery cell 10 to the pressure relief member 13 is unblocked, guaranteeing that a gas generated at the thermal runaway location of the battery cell 10 can be discharged smoothly through the pressure relief member 13.

Figure 4:
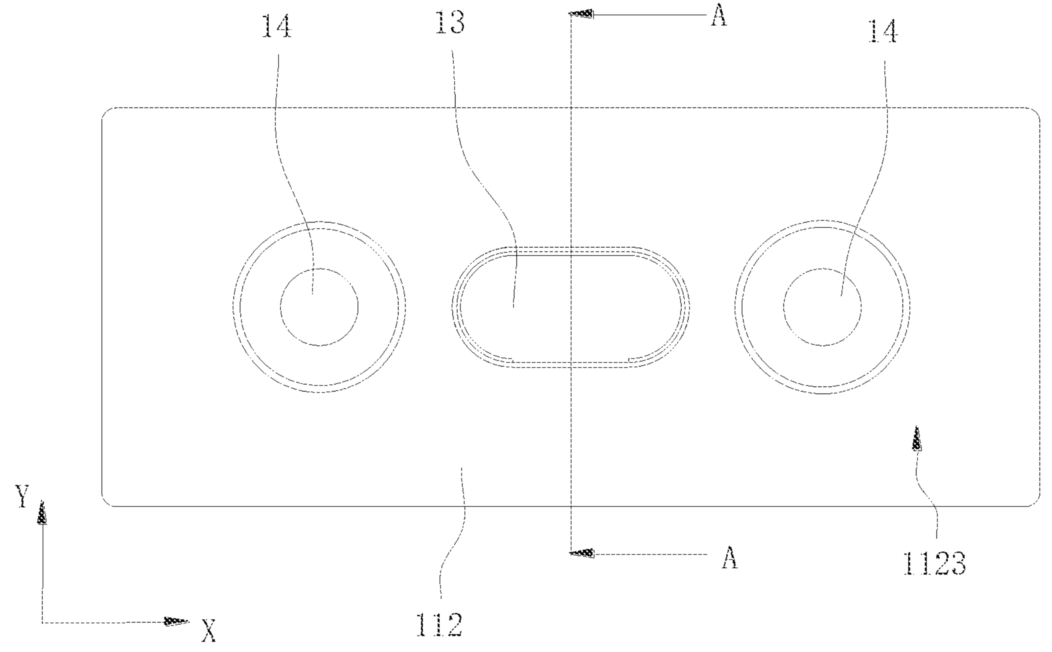
FIG. 4 is a schematic structural diagram of an end cover of the battery cell in FIG. 3, with an electrode terminal, a pressure relief member, and a sealing member connected thereto.

FIG. 4 is a schematic structural diagram of an end cover of the battery cell in FIG. 3, with an electrode terminal, a pressure relief member, and a sealing member connected thereto; and FIG. 5 is an A-A cross-sectional view of that shown in FIG. 4.

As shown in FIG. 4 and FIG. 5, in some embodiments of this application, the housing 11 is provided with a pressure relief hole 1121 that is covered by both the pressure relief member 13 and the sealing member 15, the sealing member 15 is disposed on a side of the pressure relief member 13 close to the electrode assembly 12. The sealing member 15, the pressure relief member 13, and hole walls 11211 of the pressure relief hole 1121 jointly define an enclosed space for accommodating the active substance 16.

As shown in FIG. 3, FIG. 4, and FIG. 5, based on the implementation of the preceding "the first wall is the end cover 112", two sides of the end cover 112 in the second direction Z are a first side 1122 and a second side 1123, where the first side 1122 is disposed close to the electrode assembly 12 and is located inside the battery cell 10, and the second side 1123 is far away from the electrode assembly 12 and is located outside the battery cell 10. The pressure relief member 13 is disposed close to the second side 1123, and the sealing member 15 is disposed close to the first side 1122. The pressure relief member 13, the sealing member 15, and hole walls 11211 of the pressure relief hole 1121 jointly define an enclosed space.

In the thickness direction of the end cover 112, the pressure relief member 13 is disposed inside the pressure relief hole 1121, where an edge of the pressure relief member 13 is connected to an internal wall of the pressure relief hole 1121, the sealing member 15 is located outside the pressure relief hole 1121, and the sealing member 15 is connected to a surface of the pressure relief hole 1121 close to the first side 1122.

As shown in FIG. 5, the end cover 112 further includes a first part 1124 and a second part 1125, where the first part 1124 protrudes from a hole wall 11211 of the pressure relief hole 1121 beyond a surface of the first wall, and the second part 1125 protrudes from the first side 1122 beyond a surface of the first wall. An edge of the pressure relief member 13 is connected to the first part 1124, and the sealing member 15 is connected to the second part 1125. The first part 1124, the second part 1125, the pressure relief member 13, and the sealing member 15 jointly define an enclosed space 1126.

In other embodiments, there are many manners in which the pressure relief hole 1121 is covered by the pressure relief member 13 and the sealing member 15. For example, the pressure relief member 13 and the sealing member 15 is connected to the end cover 112 respectively from the first side 1122 and the second side 1123 of the end cover 112 in the second direction Z. For another example, the pressure relief member 13 is disposed inside the pressure relief hole 1121. An area of the sealing member 15 is greater than that of the pressure relief hole 1121, the sealing member 15 covers the pressure relief hole 1121 from the first side 1122 of the end cover 112, and an edge of the sealing member 15 is connected to a surface of the end cover 112.

The active substance 16 is sealed in the pressure relief hole 1121, without occupying too much space inside the battery cell 10, so that original energy density of the battery cell 10 is maintained. In addition, the sealing member 15 is actuated to release the active substance 16, and the active substance 16 can trigger chemical reactions at a location close to the pressure relief hole 1121 to reliably actuate the pressure relief member 13. Therefore, the battery cell 10 has good safety performance.

As shown in FIG. 5, in some embodiments of this application, both the pressure relief member 13 and the sealing member 15 are sheet-shaped.

Both the pressure relief member 13 and the sealing member 15 are sheet-shaped, occupying relatively small space inside the pressure relief hole 1121, so that there is more space in the pressure relief hole 1121 for storing the active substance 16.

Figure 6:
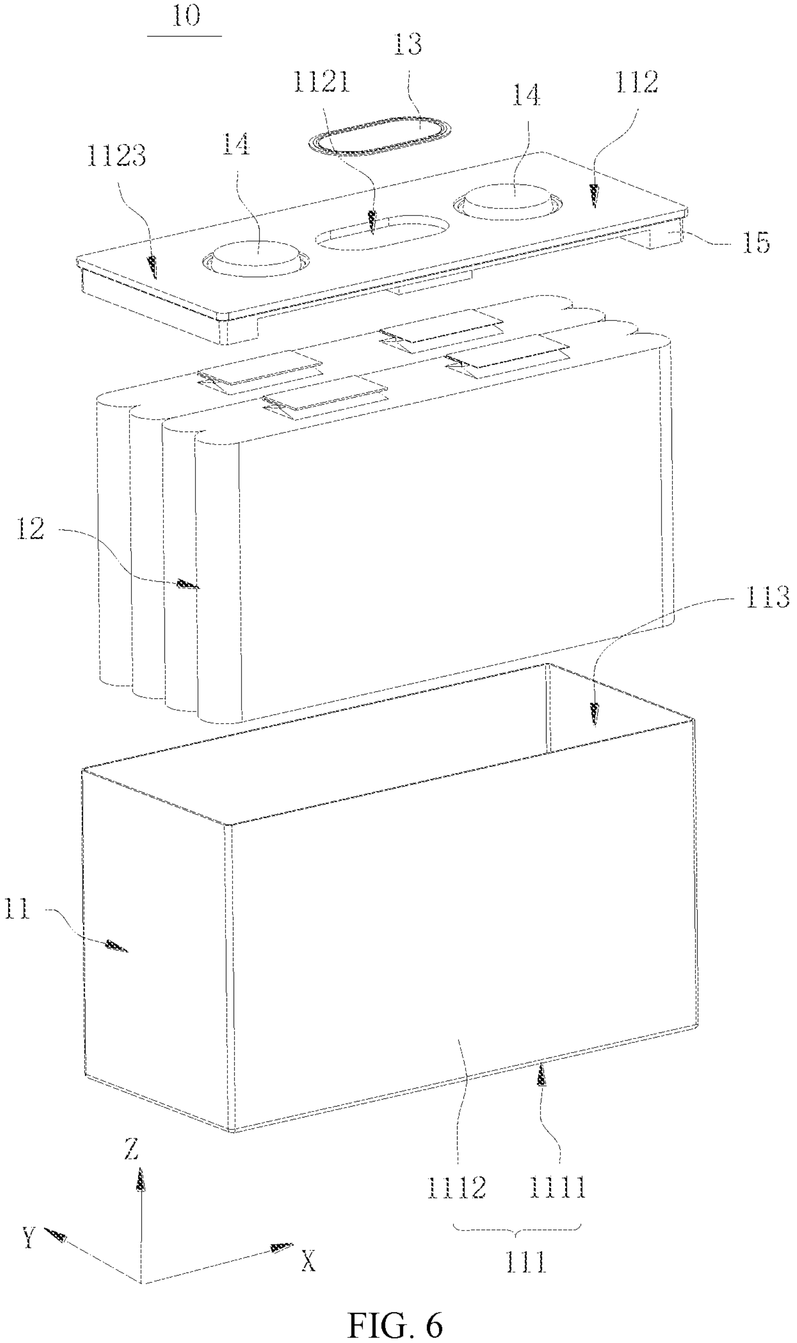
FIG. 6 is a schematic structural diagram of a second form of battery cell according to some embodiments of this application.

FIG. 6 is a schematic structural diagram of a second form of battery cell according to some embodiments of this application.

As shown in FIG. 6, in some embodiments of this application, the sealing member 15 is made of an insulating material and the sealing member 15 is disposed between the first wall and the electrode assembly 12 to insulate and isolate the electrode assembly 12 from the first wall.

Based on the implementation of the preceding "the first wall is the end cover 112", the sealing member is disposed between the end cover 112 and the electrode assembly 12 to insulate and isolate the electrode assembly 12 from the end cover 112.

The sealing member 15 may be a plastic part that is melted when the internal temperature of the battery 100 reaches a first threshold, to release the active substance 16.

The sealing member 15 may also have a locally weak part that is broken when the internal pressure of the battery 100 reaches a first threshold. The sealing member 15 further includes a via hole, corresponding to an electrode lead-out hole and the pressure relief hole 1121, for connecting the electrode terminal 14 to the current collecting member, where the pressure relief hole 1121 is communicated with an accommodating chamber inside the battery cell 10.

The sealing member 15 is not only configured to seal the active substance 16, but also configured to insulate and isolate the electrode assembly 12 from the first wall to allow the sealing member 15 to integrate functions of insulation and sealing the active substance 16, which reduces a quantity of components inside the battery cell 10, providing the battery cell 10 with a compact structure and high energy density.

Figure 7:
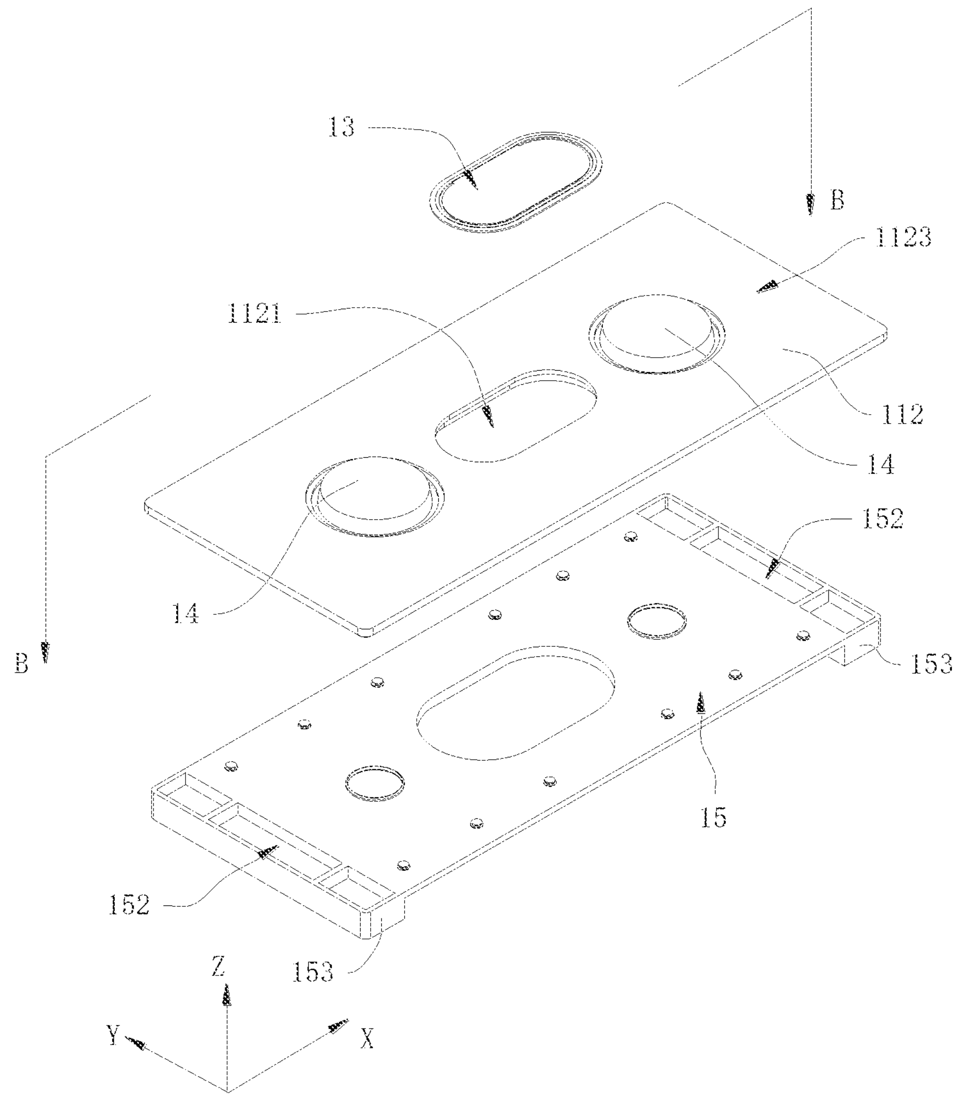
FIG. 7 is a schematic structural diagram of an end cover of the battery cell in FIG. 6, with an electrode terminal, a pressure relief member, and a sealing member connected thereto.
Figure 8:
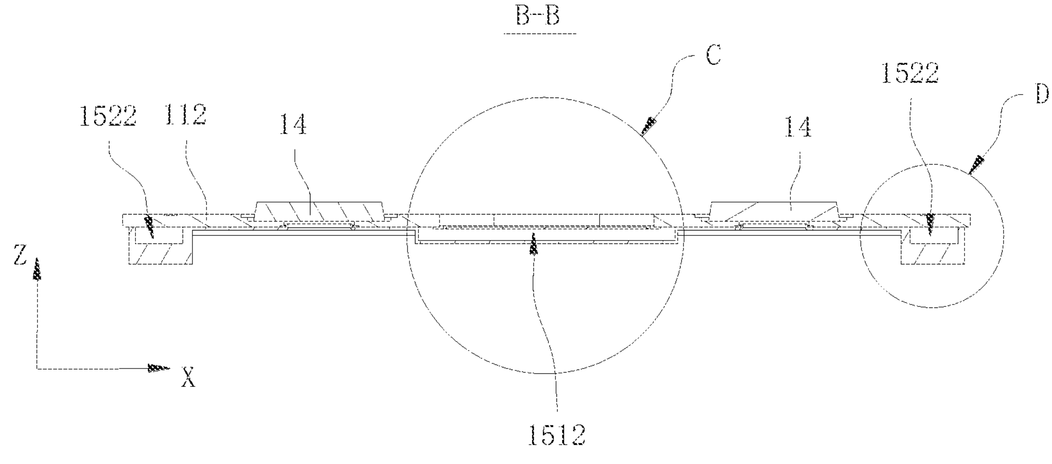
FIG. 8 is a B-B cross-sectional view of that shown in FIG. 7.

FIG. 7 is a schematic structural diagram of an end cover of the battery cell in FIG. 6, with an electrode terminal, a pressure relief member, and a sealing member connected thereto; and FIG. 8 is a B-B cross-sectional view of that shown in FIG. 7.

As shown in FIG. 7 and FIG. 8, in some embodiments of this application, the sealing member 15 is provided with a first accommodating chamber 1512 corresponding to a location of the pressure relief member 13, and at least part of the active substance 16 is sealed in the first accommodating chamber 1512.

The active substance 16 may be completely sealed in the first accommodating chamber 1512, or a part of the active substance 16 may be sealed in the first accommodating chamber 1512, with the rest part of the active substance 16 being sealed at another location.

The first accommodating chamber 1512 may be formed by jointly enclosing the sealing member 15 and other components, or may be present independently in the interior of the sealing member 15.

Projection of the pressure relief hole 1121 in an XY plane may fall into projection of the first accommodating chamber 1512 in the XY plane. In this way, the active substance 16 released from the first accommodating chamber 1512 may trigger chemical reactions in a large area near the pressure relief member 13, rapidly generating a large amount of gas to actuate the pressure relief member 13. Alternatively, the projection of the first accommodating chamber 1512 in the XY plane may fall into the projection of the pressure relief hole 1121 in the XY plane, or the projection of the first accommodating chamber 1512 in the XY plane partially coincides with the projection of the pressure relief hole 1121 in the XY plane. In this way, a storage location of the active substance 16 can be flexibly arranged according to space inside the battery cell 10, provided that when the sealing member 15 is actuated, the large amount of gas generated during the chemical reactions triggered by the active substance 16 is able to actuate the pressure relief member 13.

When actuated, the sealing member 15 can release the active substance 16 in the first accommodating chamber 1512, trigger chemical reactions near the pressure relief member 13, and reliably actuates the pressure relief member 13, so that the battery cell 10 has good safety performance.

Figure 9:
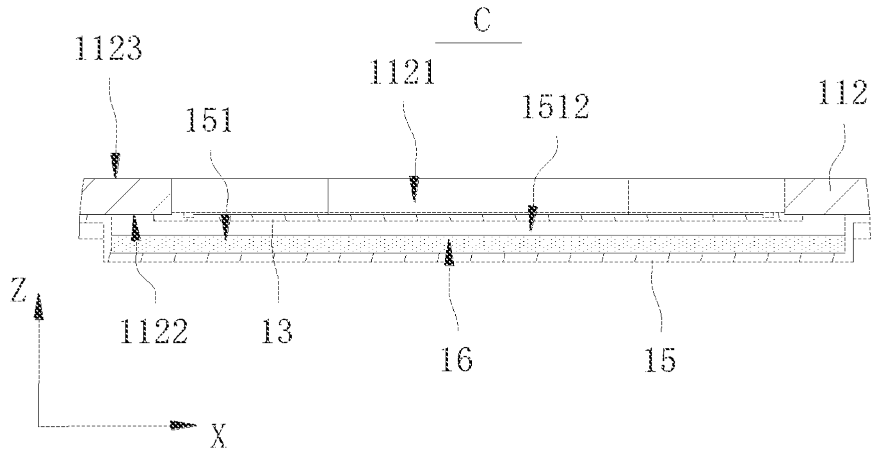
FIG. 9 is a locally enlarged view of a location C in FIG. 8 (representing a first form of first accommodating chamber)

FIG. 9 is a locally enlarged view of a location C in FIG. 8, and FIG. 9 is a schematic structural diagram of a first form of first accommodating chamber of the battery cell in FIG. 6.

As shown in FIG. 9, in some embodiments of this application, the first accommodating chamber 1512 is provided with a first opening, and the first opening is jointly enclosed by the first wall and the pressure relief member 13.

Based on the implementation of "the first wall is the end cover 112", in the first direction X, the sealing member 15 is provided with a first groove 151 at a central location, where the first groove 151 is formed by a surface of the sealing member 15 being recessed in a direction leaving the end cover 112, the first accommodating chamber 1512 is provided inside the first groove 151, and the opening 113 on a side of the first groove 151 close to the end cover 112 constitutes the first opening. Projection of the pressure relief member 13 in the XY plane falls into projection of the first groove 151 in the XY plane, the first side 1122 of the end cover 112 fits with the sealing member 15 and seals the first opening to form an enclosed first accommodating chamber 1512.

Figures 10, 11:
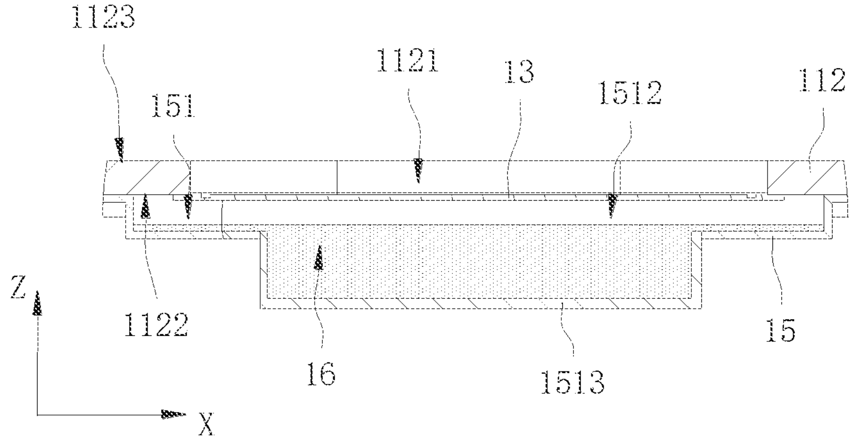
FIG. 10 is a schematic structural diagram of a second form of first accommodating chamber of the battery cell in FIG. 6.
FIG. 11 is a schematic structural diagram of a third form of first accommodating chamber of the battery cell in FIG. 6.

FIG. 10 is a schematic structural diagram of a second form of first accommodating chamber of the battery cell in FIG. 6.

As shown in FIG. 10, specifically, a middle part of the first groove 151 further sags in a direction leaving the end cover 112 to form a storage portion 1513, where the storage portion 1513 is configured to store the active substance 16, to allow more active substance 16 to be stored near the pressure relief member 13. Projection of the storage portion 1513 in the XY plane falls into the projection of the pressure relief member 13 in the XY plane. In this way, when the sealing member 15 is actuated, chemical reactions can be triggered preferentially near the pressure relief member 13 and an actuation speed of the pressure relief member 13 can be increased. A side of the storage portion leaving the end cover 112 may abut against a surface of the electrode assembly 12, so that two sides of the sealing member 15 are attached between the end cover 112 and the electrode assembly 12, allowing the battery cell 10 to have a compact structure.

Figure 12:
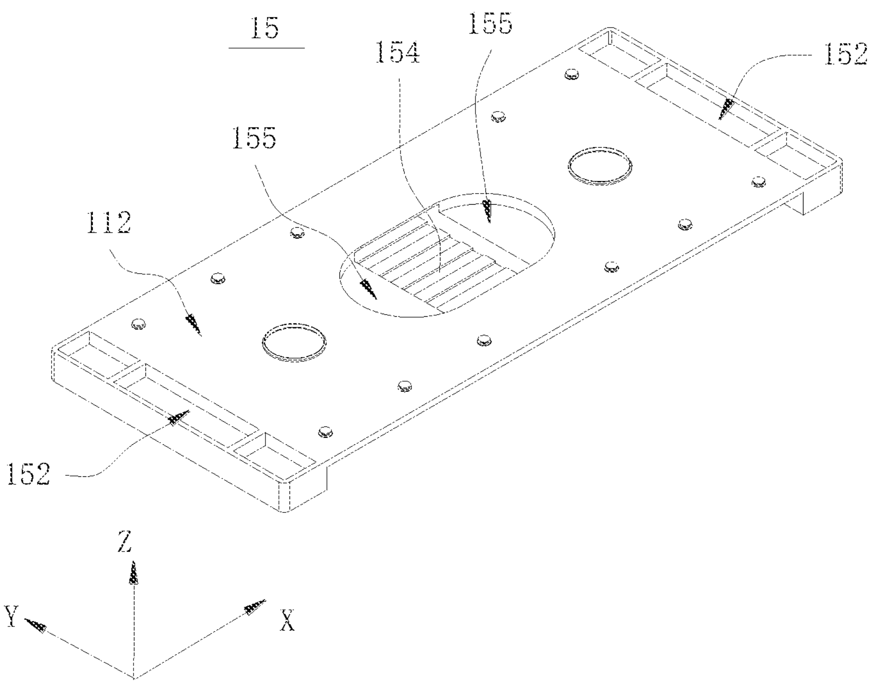
FIG. 12 is a schematic structural diagram of a sealing member corresponding to the third form of first accommodating chamber of the battery cell in FIG. 11.

FIG. 11 is a schematic structural diagram of a third form of first accommodating chamber of the sealing member of the battery cell in FIG. 6; and FIG. 12 is a schematic structural diagram of a sealing member in FIG. 11.

As shown in FIG. 11 and FIG. 12, in other embodiments, the first accommodating chamber 1512 may also be formed independently in an enclosed space inside the sealing member 15. The active substance 16 is sealed inside the first accommodating chamber 1512 by using composite injection. Specifically, a support portion 154 is provided at the via hole of the corresponding pressure relief hole 1121 of the sealing member 15, where the support portion 154 blocks part of the via hole and expose space on two sides of the hole in the first direction X, to form two exhaust spaces 155. One side of the support portion 154 abuts against the pressure relief member 13, so that the two exhaust spaces 155 are connected to the interior of the battery cell 10. The support portion 154 and the storage portion 1513 of the first groove 151 jointly enclose an enclosed first accommodating chamber 1512, and the active substance 16 is sealed inside the first accommodating chamber 1512.

The first wall, the pressure relief member 13, and the sealing member 15 jointly form an enclosed first accommodating chamber 1512, so that the active substance 16 can be sealed near the pressure relief member 13, and sealing of the active substance 16 can be easily implemented, where the active substance 16, when released, can trigger chemical reactions near the pressure relief member 13.

Figure 13:
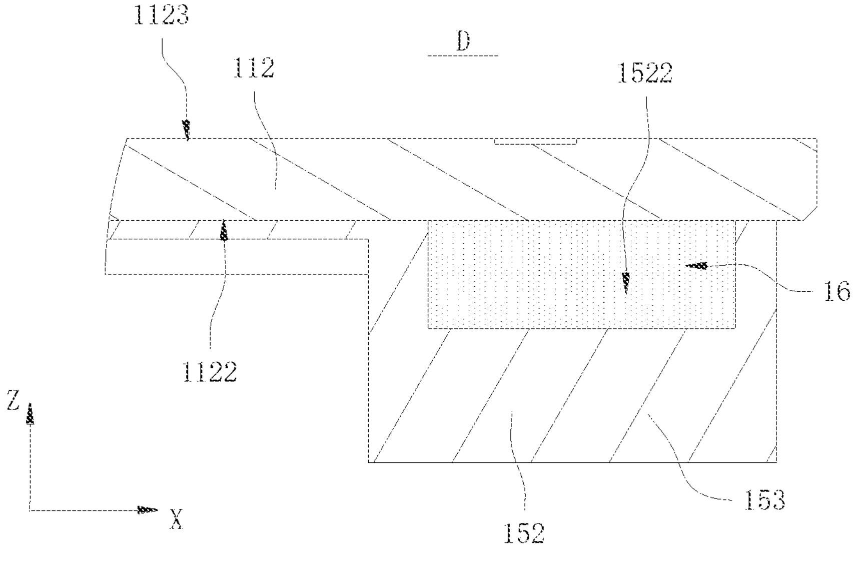
FIG. 13 is a locally enlarged view of a location D in FIG. 8.

FIG. 13 is a locally enlarged view of a location D in FIG. 8.

As shown in FIG. 8 and FIG. 13, in some embodiments of this application, the first wall is a rectangle, the sealing member 15 is further provided with two second accommodating chambers 1522, and in a length direction of the first wall, the two second accommodating chambers 1522 are separately located on two sides of the first accommodating chamber 1512. And, a part of the active substance 16 is sealed in the first accommodating chamber 1512, while another part of the active substance 16 is sealed in the two second accommodating chambers 1522.

Based on the implementation of "the first wall is the end cover 112", a length direction of the end cover 112 extends in the first direction X, and a width direction of the end cover 112 extends in the third direction Y, where in the first direction, two ends of the sealing member 15 are provided with one second accommodating chamber 1522 respectively. The second accommodating chamber 1522 may be formed independently in an enclosed space inside the sealing member 15. The active substance 16 is sealed inside the second accommodating chamber 1522 by using composite injection. The second accommodating chamber 1522 may also be an enclosed space jointly enclosed by the sealing member 15 and the end cover 112.

In a length direction of the first wall, one second accommodating chamber 1522 is provided respectively on two sides of the first accommodating chamber 1512, a part of the active substance 16 is sealed in the second accommodating chamber 1522, and when the active substance 16 in the second accommodating chamber 1522 is released, chemical reactions can be triggered at a corresponding location of the electrode assembly 12, to make a side of the electrode assembly 12 close to the pressure relief member 13 be fully broken and keep the exhaust passage from the thermal runaway location of the battery cell 10 to the pressure relief member 13 unblocked.

As shown in FIG. 13, in some embodiments of this application, the second accommodating chamber 1522 is provided with a second opening, and the second opening is enclosed by the first wall.

Specifically, in the first direction, two ends of the sealing member 15 are provided with one second groove 152 respectively, where the second groove 152 is formed by a surface of the sealing member 15 being recessed in a direction leaving the end cover 112, the second accommodating chamber 1522 is provided inside the second groove 152, and the opening 113 of the second groove 152 close to the end cover 112 constitutes the second opening. The sealing member 15 fits with the end cover 112 to enclose the second opening, forming an enclosed second accommodating chamber 1522.

A size of the second accommodating chamber 1522 may be the same as that of the electrode assembly 12 in the third direction Y, so that when corners at two ends of the electrode assembly 12 on a side close to the end cover 112 in the first direction X are broken and disintegrated, the exhaust passage from the thermal runaway location of the electrode assembly 12 to the pressure relief member 13 is unblocked. The second accommodating chamber 1522 may alternatively be centered with respect to the electrode assembly 12 in the third direction Y.

Specifically, two sides of the sealing member 15 in the first direction X are provided with connecting portions 153 that abut against a surface of the electrode assembly 12, where the connecting portion 153 is formed by protrusion of a side of the sealing member 15 leaving the end cover 112 in the second direction Z, and the second groove 152 is formed inside the connecting portion, providing the sealing member 15 with a compact structure.

The first wall and the sealing member 15 jointly form an enclosed second accommodating chamber 1522. The active substance 16, when released, can trigger chemical reactions at the corresponding location, and sealing of the active substance 16 can be easily implemented.

Some embodiments of this application provide a battery 100, including the battery cell 10 in some embodiments of this application.

Due to characteristics of the battery cell 10, the battery 100 in some embodiments of this application also has good safety performance.

Some embodiments of this application provide an electric apparatus, including the battery 100.

Due to characteristics of the battery 100, the electric apparatus in some embodiments of this application also has good safety performance.

Some embodiments of this application provide a method for manufacturing battery cell 10, including:

- providing a housing 11, where a first wall of the housing 11 is provided with a pressure relief member 13;
- providing an electrode assembly 12;
- providing an electrolyte;
- providing a sealing member 15 and an active substance 16, where the sealing member 15 is configured to seal the active substance 16, the sealing member 15 is configured to be actuated when an internal pressure or temperature of the battery cell 10 reaches a first threshold, to release the active substance 16, and the active substance 16 is able to react with the electrolyte and/or the electrode assembly 12, to increase the internal pressure or temperature of the battery cell 10, thereby actuating the pressure relief member 13; and
- disposing the electrode assembly 12 inside the housing 11, sealing the active substance 16 at a side of the electrode assembly 12 close to the first wall by using the sealing member 15, and injecting the electrolyte into the housing 11.

Some embodiments of this application provide a device for manufacturing battery cell 10, including:

- a first providing apparatus, configured to provide a housing 11, where a first wall of the housing 11 is provided with a pressure relief member 13;
- a second providing apparatus, configured to provide an electrode assembly 12;
- a third providing apparatus, configured to provide an electrolyte;
- a fourth providing apparatus, configured to provide a sealing member 15 and an active substance 16, where the sealing member 15 is configured to seal the active substance 16, the sealing member 15 is configured to be actuated when an internal pressure or temperature of the battery cell 10 reaches a first threshold, to release the active substance 16, so that the active substance 16 is able to react with the electrolyte and/or the electrode assembly 12, to increase the internal pressure or temperature of the battery cell 10, thereby actuating the pressure relief member 13; and
- a mounting module, configured to dispose the electrode assembly 12 in the housing 11, seal the active substance 16 at a side of the electrode assembly 12 close to the first wall by using the sealing member 15, and inject the electrolyte into the housing 11.

As shown in FIG. 3 and FIG. 5, some embodiments of this application provide a battery cell 10, where the battery cell 10 includes a housing body 111, an end cover 112, an electrode assembly 12, a pressure relief member 13, and a sealing member 15. The end cover 112 is provided with a pressure relief hole 1121. The pressure relief hole 1121 is provided with an explosion-proof sheet having an upper and lower layer structure, with the upper layer of the explosion-proof sheet being the pressure relief member 13, and the lower layer of the explosion-proof sheet being the sealing member 15. Generally, the explosion-proof sheet is made of a metal material, for example, aluminum, and steel, or may be made of a plastic material. The active substance 16 is added between the upper layer and the lower layer of the explosion-proof sheet. Generally, the active substance 16 is a strong oxidizing agent, for example, potassium permanganate, potassium dichromate, sodium hypochlorite, hydrogen peroxide, lead dioxide, periodic acid, cobaltic fluoride, and sodium ferrate. When a gas is generated slowly due to thermal runaway inside the battery cell, an internal gas pressure reaches a first threshold but is lower than an opening pressure of the upper layer of the explosion-proof sheet, the internal gas pressure of the battery cell may burst open the lower layer of the explosion-proof sheet, and the active substance 16 released reacts with the electrolyte. This makes the electrode assembly close to the pressure relief member 13 fail, and a large amount of high-temperature and high-pressure gas generated further burst open the upper layer of the explosion-proof sheet. In this case, heat is released, and broken and disintegrated electrode plates are ejected, increasing an exhaust clearance at the pressure relief hole 1121. This makes the failed electrode plates to be discharged smoothly when the electrode assembly away from the pressure relief hole 1121 has failed, thereby avoiding a serious safety accident caused by the battery cell 10 that bursts open because the pressure relief member 13 fails to be opened and the electrode assembly 12 rushes up.

As shown in FIG. 6 to FIG. 13, some embodiments of this application provide a battery cell 10, including a housing body 111, an end cover 112, an electrode assembly 12, a pressure relief member 13, and a sealing member 15, where the end cover 112 is provided with the pressure relief member 13. The sealing member 15 is lower plastics and disposed between the end cover 112 and the electrode assembly 12. In a length direction of the end cover 112 (that is the first direction X), a length of the sealing member 15 is approximately the same as that of the electrode assembly 12. A middle part and two ends of the sealing member 15 are all provided with a half-open groove. The sealing member 15 fits with the end cover 112, to seal the active substance 16 inside the groove. When high temperature occurs after gas generation inside the battery cell 10, the lower plastics is melted, releasing the active substance 16 to react with the electrode assembly. Electrode plates near the pressure relief hole 1121 are discharged, and an exhaust clearance is cleared to prevent bursting of the end cover 112 out of the housing body 111.

It should be noted that, without conflicts, the embodiments and features in the embodiments in this application may be reference with each other.

The foregoing descriptions are merely preferred embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A battery cell, comprising:

a housing, comprising a housing body and an end cover;
a pressure relief member disposed on the end cover;
an electrode assembly disposed inside the housing;
an electrolyte, immersing the electrode assembly;
a sealing member; and
an active substance, wherein the sealing member is configured to seal the active substance to the end cover on a side of the end cover facing the electrode assembly; and the sealing member is configured to be actuated when an internal pressure or temperature of the battery cell reaches a first threshold, to release the active substance, so that the active substance reacts with the electrolyte and/or the electrode assembly to increase the internal pressure or temperature of the battery cell; and wherein the active substance comprises at least one of:

potassium dichromate,
sodium hypochlorite,
lead dioxide,
periodic acid,
cobaltic fluoride, and
sodium ferrate.

2. The battery cell according to claim 1, wherein the pressure relief member is configured to be actuated when the internal pressure or temperature of the battery cell reaches a second threshold, wherein the second threshold is greater than the first threshold.

3. The battery cell according to claim 1, wherein the sealing member seals the active substance at a location of the end cover corresponding to the pressure relief member.

4. The battery cell according to claim 3, wherein the end cover is provided with a pressure relief hole that is covered by both the pressure relief member and the sealing member, the sealing member is disposed on a side of the pressure relief member close to the electrode assembly; and the sealing member, the pressure relief member, and hole walls of the pressure relief hole jointly define an enclosed space for accommodating the active substance.

5. The battery cell according to claim 4, wherein both the pressure relief member and the sealing member are sheet-shaped.

6. The battery cell according to claim 3, wherein the sealing member is made of an insulating material and the sealing member is disposed between the end cover and the electrode assembly, to insulate and isolate the electrode assembly from the active substance.

7. The battery cell according to claim 6, wherein the sealing member is provided with a first accommodating chamber corresponding to a location of the pressure relief member, and at least part of the active substance is sealed in the first accommodating chamber.

8. The battery cell according to claim 7, wherein the first accommodating chamber is provided with a first opening, and the first opening is jointly enclosed by the end cover and the pressure relief member.

9. The battery cell according to claim 7, wherein the end cover is in a rectangular shape, the sealing member is further provided with two second accommodating chambers, and in a length direction of the end cover, the two second accommodating chambers are separately located on two sides of the first accommodating chamber; and one part of the active substance is sealed in the first accommodating chamber while the other part of the active substance is sealed in the two second accommodating chambers.

10. The battery cell according to claim 9, wherein each second accommodating chamber is provided with a second opening, and the second opening is enclosed by the end cover.

11. A battery, comprising the battery cell according to claim 1.

12. An electric apparatus, comprising the battery according to claim 11.

* * * * *